Nov. 21, 1961  H. C. NYSTROM  3,009,668
DISPLACEMENT TYPE AIRFOIL FLAP WITH BOUNDARY LAYER CONTROL
Filed May 12, 1958  4 Sheets-Sheet 4

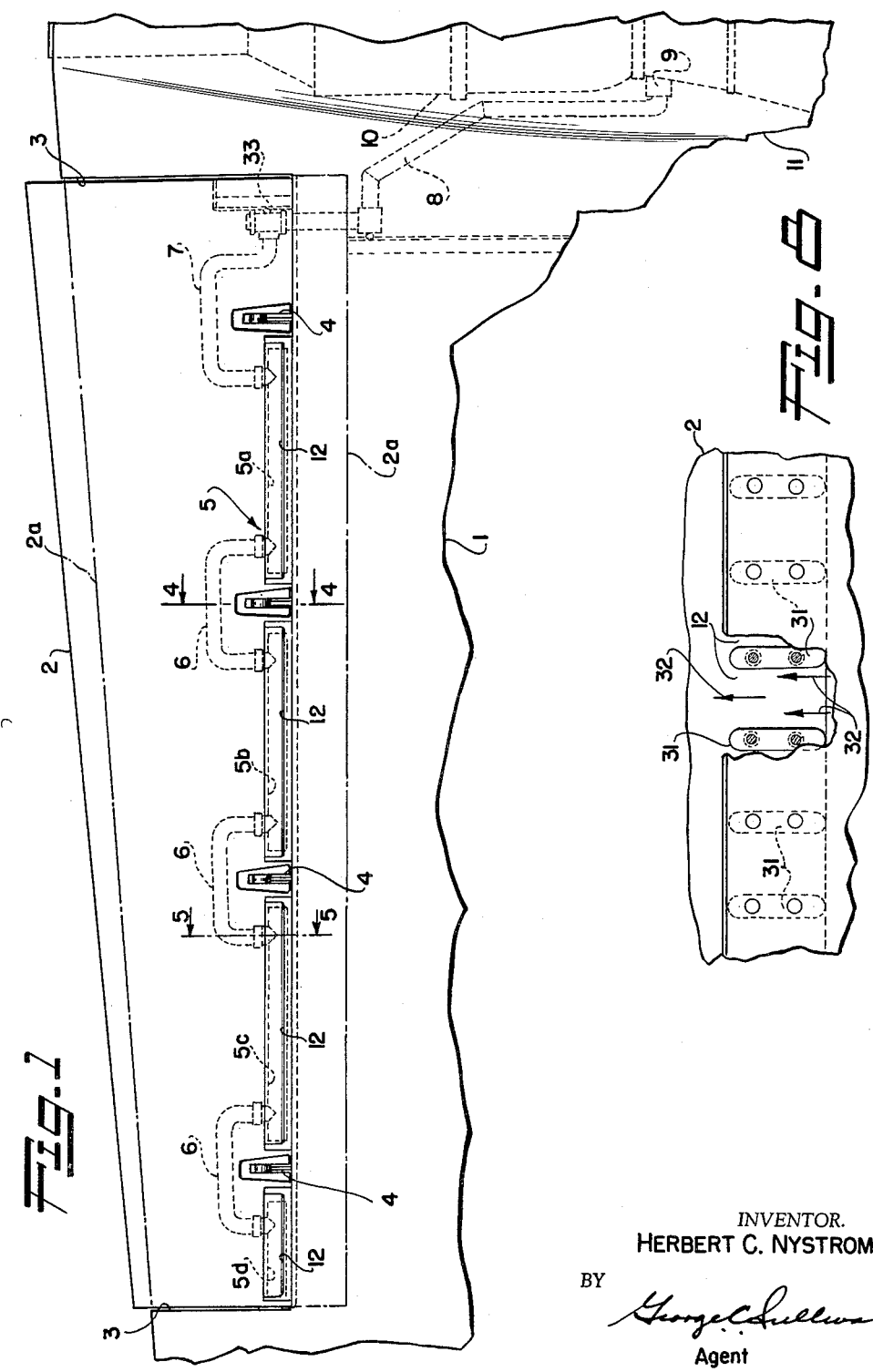

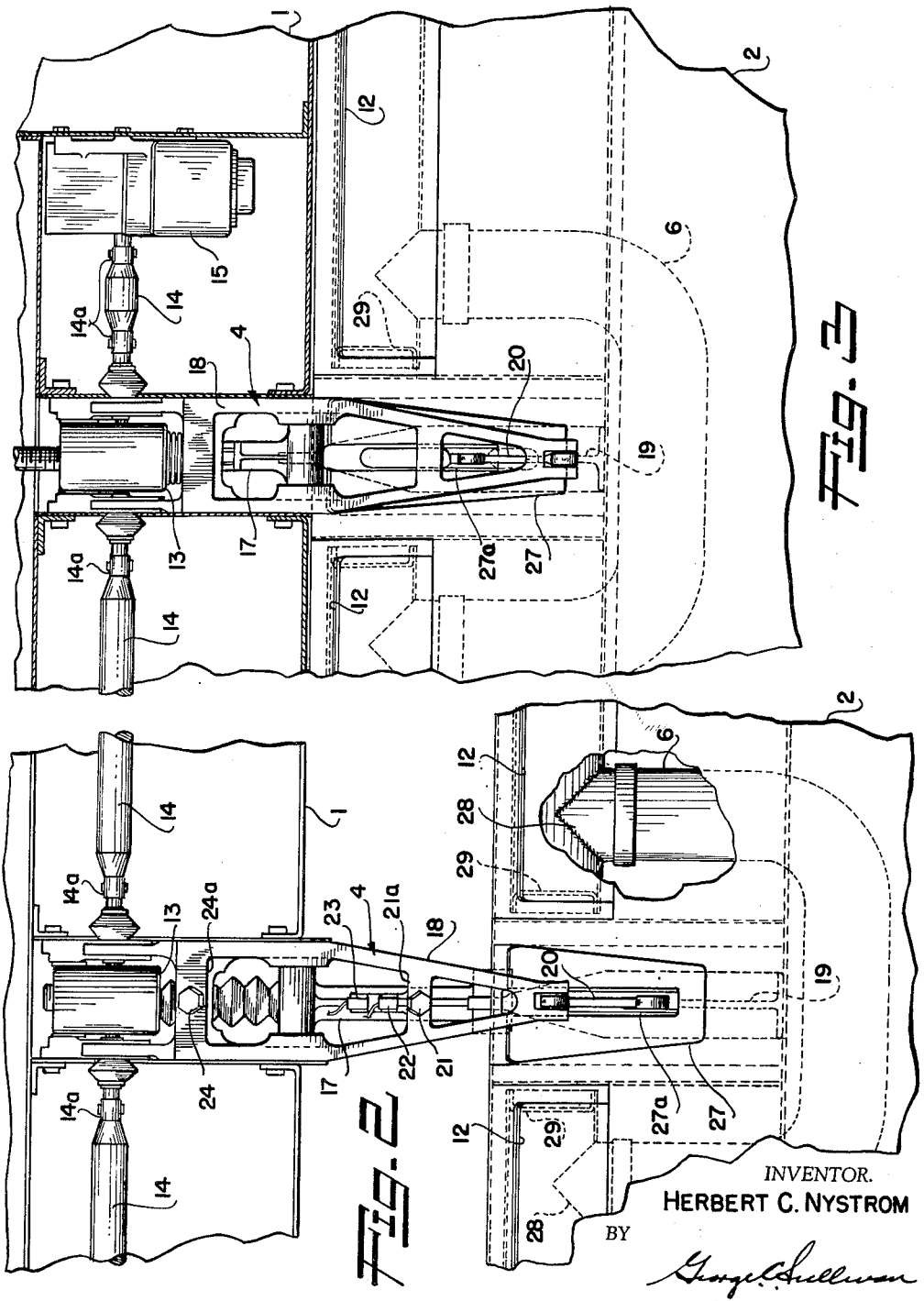

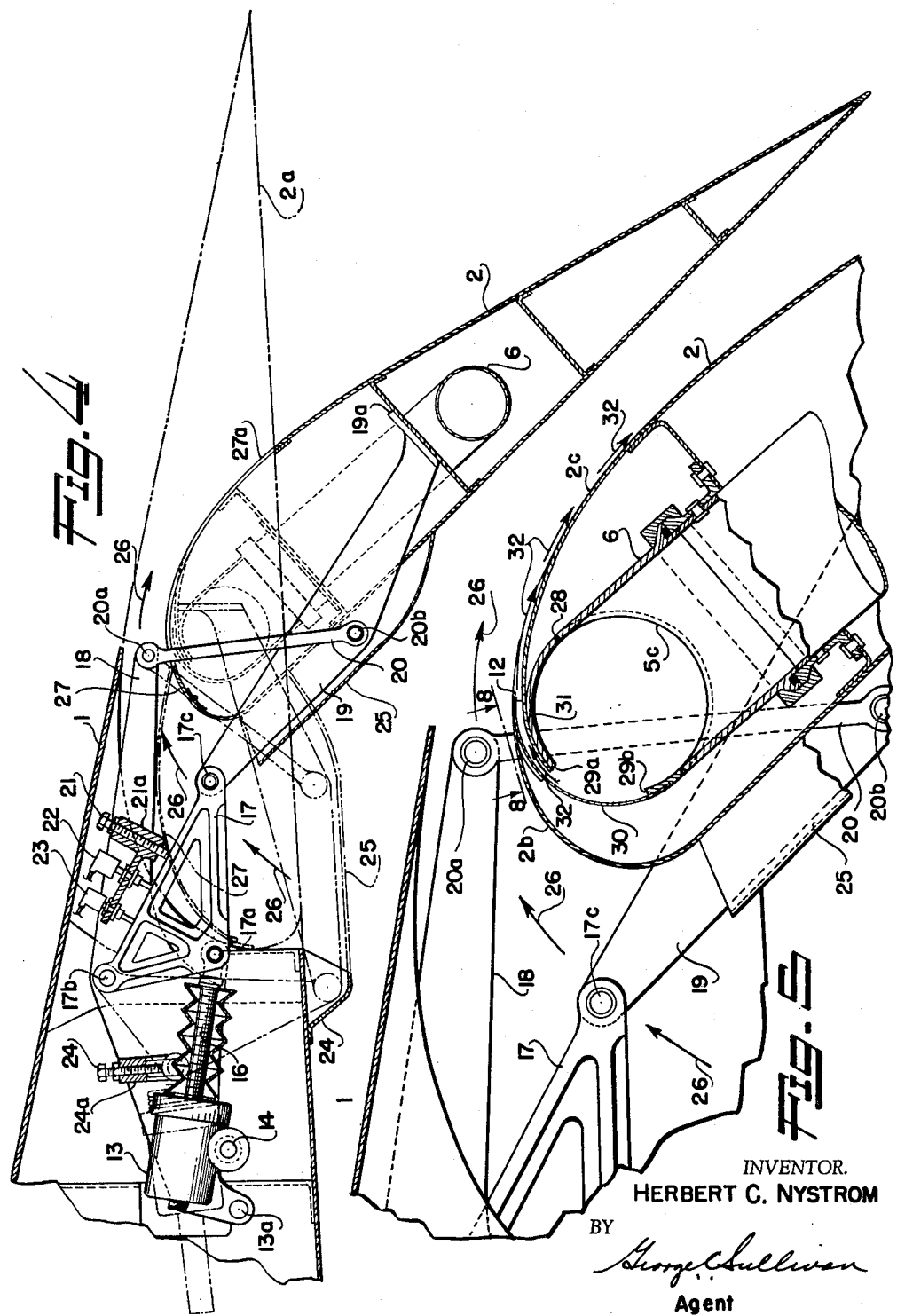

INVENTOR.
HERBERT C. NYSTROM
BY
*George C. Sullivan*
Agent

United States Patent Office 3,009,668
Patented Nov. 21, 1961

3,009,668
DISPLACEMENT TYPE AIRFOIL FLAP WITH
BOUNDARY LAYER CONTROL
Herbert C. Nystrom, Tarzana, Calif., assignor to Lockheed Aircraft Corporation, Burbank, Calif.
Filed May 12, 1958, Ser. No. 734,638
10 Claims. (Cl. 244—42)

This invention concerns airfoil flap boundary layer control, and more particularly a boundary layer control airflow over an air foil flap that is chordally displaceable to the main airfoil as a slotted flap.

Various arrangements and devices have been known heretofore for effecting removal or control of boundary layer air on airfoils, whether the airfoils are fixed or movable to accomplish control, such removal or control accomplished by a positive pressure efflux or suction through slots or openings in the airfoil surface. With the type of boundary layer concerned with here of a positive pressure efflux flow over an air foil flap extending spanwise along the trailing edge of an airfoil wing, previous known devices have been primarily of two arrangements. One arrangement has been to provide efflux nozzles or slots adjacent the trailing edge of the wing for discharging in an aft direction over the flap when extended. This arrangement lacks attainment of the full benefit of a boundary layer control airflow inasmuch as when the flap is actuated, whether by rotation about a fixed spanwise axis relative to the wing or by a chordwise displacement of the flap in an aft direction concurrently with rotation, there is a change in the relative angular relationship between the boundary layer control airflow discharge and the flap surface over which the discharge is directed. Thus, whereas there is only a limited relative angular relationship range between the wing nozzles and flap surface for the most beneficial results of a boundary layer control discharge air flow from the wing over the flap, this gives rise to the second arrangement of providing efflux nozzles or slots in the flap proper whereby the boundary layer discharge impingement on the flap is at a constant relative angle to the flap surface. This arrangement too has had limitations in the prior art to the type of flap that rotates about a fixed spanwise axis relative to the wing because of the necessity of delivery of pressurized air to the flap interior, for to provide a boundary layer control discharge over a flap having a chordwise displacement relative to the trailing edge of a wing requires an extensible or telescoping delivery conduit or duct capable of compensating for such chordal displacement of the flap.

Therefore, with such a delivery conduit capable of permitting a pressurized airflow to the flap for discharge through the efflux nozzles or slots therein when the flap is rotated and chordally displaced relative to the wing, the more advantageous benefits of a displaced flap are attainable, such as greater chord for greater lift with concurrent increased drag, plus a slot flow from the lower wing surface to the upper flap surface. Also, this is in addition to the increased efficiency of a boundary layer control airflow over the upper flap surface at a constant angular impingement therewith regardless of the position of the flap relative to the airfoil trailing edge.

Accordingly, it is an object of this invention to provide a boundary layer control airflow over a displaceable trailing edge airfoil flap with the airflow having a constant angle of impingement with the flap surface regardless of flap position relative to the airfoil trailing edge.

A further object of this invention is to provide a high efficiency airfoil trailing edge flap having an airflow thereover from the lower airfoil surface through a slot formed between the trailing edge of the airfoil and the leading edge of the flap when extended besides having a boundary layer control airflow over the flap with a constant angle of impingement with the flap surface regardless of flap position relative to the airfoil trailing edge.

Another object of this invention is to provide a means for supplying boundary layer control pressurized air to a displacement type airfoil trailing edge flap for discharge therefrom at a constant angle of impingement with the flap surface regardless of flap position relative to the airfoil trailing edge.

It is a further object of this invention to provide a displacement type airfoil trailing edge flap having a rotational motion during actuation of constant angular rate with respect to any spanwise station along the flap and having a boundary layer control airflow discharge of constant angular impingement with the flap surface regardless of flap position relative to the air foil trailing edge.

Still another object of this invention is to provide a displacement type airfoil trailing edge flap having a linear motion during actuation based on a percentage of flap chord length and airfoil chord length, with a boundary layer control airflow discharge of constant angluar impingement with the flap surface regardless of flap position relative to the airfoil trailing edge.

It is a still further object of this invention to provide a displacement type airfoil trailing edge flap forming a slot between the trailing edge of the airfoil and the leading edge of the flap during extension, the width of the slot at any spanwise station along the flap being proportional to both the flap chord and the air foil chord and allowing an airflow supplemental to a boundary layer control airflow discharge of constant angular impingement with the flap surface regardless of flap position relative to the air foil trailing edge.

Further objects and advantages of this invention will become apparent from the following description taken in connection with the accompanying drawings in which:

FIGURE 1 is a partial plan view of an aft or trailing edge portion of an airfoil having a spanwise extending flap connected thereto, the flap being shown in extended position;

FIGURE 2 shows the enlarged details of one of the connectors between the air foil trailing edge and the flap leading edge when the flap is extended, the upper surface of the airfoil being removed for clarity;

FIGURE 3 shows the enlarged details of another connector between the airfoil trailing edge and flap leading edge when the flap is retracted plus the flap actuating motor, the upper surface of the airfoil being removed for clarity;

FIGURE 4 is a partial cross-sectional view taken along line 4—4 of FIGURE 1;

FIGURE 5 is an enlarged partial cross-sectional view taken along line 5—5 of FIGURE 1;

Figure 7:
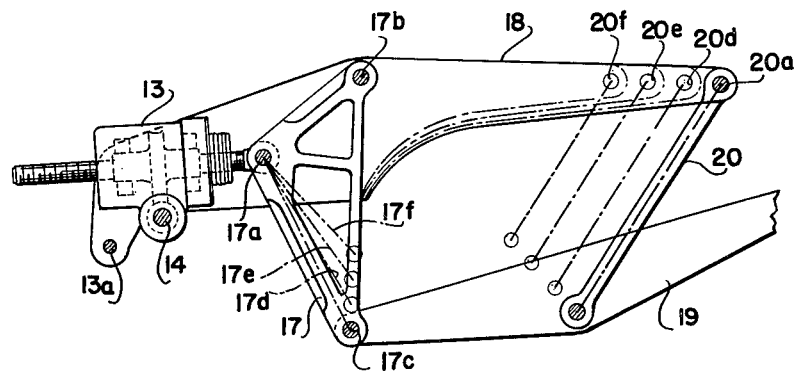

FIGURE 7 schematically indicates the linkage arrangement means between the airfoil and flap for forming a variable width slot between the trailing edge of the airfoil and the leading edge of the flap when the flap is in extended position; and FIGURE 8 is a view taken along line 8—8 of FIGURE 5.

Generally stated, one embodiment of the invention is practiced by a conduit or duct system interconnecting a pressurized air source and efflux nozzles or slots located on the upper leading edge surface of the flap for discharge of the pressured air over the upper surface of the flap as a boundary layer control airflow. The flap, being of the displacement type whereby the flap is chordally displaced from the trailing edge of its associated airfoil creating a slot passage for a flow of air therethrough from the lower surface of the airfoil and over the upper surface of the flap, attains a more efficient boundary layer control airflow thereover by having the efflux nozzles or slots contained therein resulting in the boundary layer control airflow impinging on the upper surface of the flap at a constant angle regardless of the degree or amount of extension of the flap relative to the airfoil. Because of the most effectiveness of boundary layer control airflow over the upper surface of the flap occurring with an additional positive airflow after a partial extension of the flap, there is a sliding valve structure incorporated within the pressurized air duct system between the pressured source and the flap to compensate for the amount of chordwise relative displacement between the flap and the airfoil, such valve allowing actual passage of the pressurized air to the flap proper within the range of flap extension relative to the airfoil that a boundary layer control airflow is desired.

More specifically, in FIGURE 1 there is shown a portion of the trailing or aft portion of an airfoil or wing 1 having a trailing edge flap 2 connected thereto and fitting into a spanwise cutout 3 in the wing. Connection between wing 1 and flap 2 is accomplished by a plurality of linkage structures 4, which will be described in more detail hereinafter. Such linkage structures 4 also contain actuable or drive mechanisms for normal extension or retraction of the flap 2 relative to the retracted or nested position relative to wing 1 in cutout 3.

A system of conduit or duct members 5 extend spanwise along the inner leading edge of flap 2. Duct members 5a, 5b, 5c and 5d are interconnected with bypass duct members 6 for bypassing the ducting around the linkage structures 4 in the flap 2. Bypass duct member 7 around the flap linkage structure 4 closest to a pressurized air source, which in this case is the inboard linkage structure 4, is connected to a duct assembly 8 for supplying pressurized air thereto from a valved compressor discharge bleed pad 9 of a gas turbine powerplant 10 located within an engine nacelle 11 and used for powering the aircraft. While I have shown a gas turbine powerplant 10 as the source of pressurized air, it is to be understood that other appropriate means such as small turbo compressors, superchargers, etc., may be utilized as a pressurized air source. Likewise, the aircraft powerplant means may be of the reciprocating type rather than the turbo-prop or turbo-jet type shown.

The pressurized air supplied to duct members 5a, 5b, 5c and 5d is discharged therefrom through elongated or spanwise extending nozzles or slots 12 on the upper leading surface of flap 2 as a boundary layer control airflow over the upper surface of flap 2 when extended from wing 1 as indicated in FIGURE 1 by solid lines. The retracted plan view position of flap 2 is indicated by phantom lines 2a.

Referring to FIGURES 2, 3 and 4, each of the linkage structures 4 comprises a mechanical screw-jack 13, all of which are driven concurrently by a series of interconnecting torque tubes or drive shafts 14, all of which are in turn driven in unison by an electric motor 15 housed within the structure of wing 1, it being understood that motor 15 may be hydraulic or any other appropriate means. Screw-jacks 13 are pivotally mounted to the internal structure of wing 1, as indicated at 13a, to allow for proper alignment of screw-jack 13 during actuation of flap 2. To allow for the change in alignment of torque tubes 14 during the alignment rotation of screw-jacks 13 around fixed pivots 13a, univeral couplings 14a are incorporated at the connecting points between torque tubes 14 with the input drives of screw-jacks 13 and the output drive of motor 15.

The screw-jack shaft is pivotally connected to a bellcrank 17 at 17a, bellcrank 17 pivotally mounted at 17b to a stationary wing fitting 18 fixedly secured to the internal structure of wing 1. Bellcrank 17 is also pivotally connected to a flap fitting 19 as indicated at 17c, flap fitting 19 in turn being fixedly secured to the internal structure of flap 2, as indicated by 19a. A four-bar linkage system is completed by a flap link 20 pivotally connected at one end to the aft end of wing fitting 18, as indicated at 20a, and pivotally connected to flap fitting 19 at the other end, as indicated by 20b.

In order to prevent over-travel of flap 2 during extension thereof a down-flap stop means 21 is incorporated in a bridge brace member 21a of one of the wing fittings 18 as is best clearly shown in FIGURES 2 and 4. The down-flap stop means 21 by incorporating threads thereby allows adjustability of the minimum amount of down travel or extension travel of flap 2. When flap 2 reaches the maximum amount of extension to be allowed by the down-flap stop means 21, the bellcrank 17 is prevented from further rotation about pivot 17b by the stop means 21. Also mounted on bridge brace member 21a are two micro-relay switches 22 and 23, switch 22 controlling the power shutoff to motor 15 when the maximum amount of extension of flap 2 is reached, while switch 23 controls the opening and closing of pressurized air delivery valve on the compressor discharge bleed pad 9 of gas turbine powerplant 10, as shown in FIGURE 1 and discussed above. The retracted position of flap 2 is likewise controlled by an up-flap stop means 24 mounted on a bridge brace member 24a similar to the down-flap stop means 21.

When the flap 2 is in the retracted position as shown by the phantom lines in FIGURE 4, the lower portion of flap fitting 19 protrudes below the lower surface of wing 1, and to provide a smooth airflow thereover there is incorporated a two-piece fairing structure comprising fairing members 24 and 25. The forward fairing member 24 is secured to the lower surface of wing 1 by any appropriate means, while the aft fairing member 25 is secured to the lower surface of flap 2 by any appropriate means. Thus, when the flap is in retracted position 2a, the fairing members 24 and 25 are juxtaposed to present as smooth an airflow as possible past the protuberance in the bottom surface of wing 1 caused by the flap fitting 19. A spanwise slot opening is formed between fairing members 24 and 25 when flap 2 is extended by the movement of fairing member 25 with flap 2 relative to the forward fairing member 24. This in turn presents an airflow path from the lower surface of wing 1 through the slot and over the upper surface of flap 2 as indicated by arrows 26 in FIGURES 4 and 5. This relative movement between fairing members 24 and 25 and the likewise chordal and rotative displacement of flap 2 relative to wing 1 is accomplished by movement of structure 4 driven by screw-jacks 13.

In order to allow for the rotation of flap link 20 about pivotal connection 20b relative to the flap 2, there is a slot 27a extending chordwise along door 27 in the forward upper surface of flap 2 through which the flap link 20 can move for the relative movement between flap link 20 and flap 2 without interference. Door 27 is pivotally spring-biased outwardly and serves to allow wing fitting 18 to be located within the outer confines of flap 2 when the flap is retracted as can best be seen in FIGURE 4.

As can best be seen in FIGURE 2, the bypass duct members 6 are joined to the spanwise duct members 5a, 5b, 5c and 5d by a T-type welded joint as indicated by 28. Also, each end of the longitudinal duct members 5a, 5b, 5c and 5d are sealed or closed by any appropriate means, such as indicated by caps 29.

FIGURES 5 and 8 show the details of the preferred embodiment of the elongated spanwise nozzles or slots 12 in the upper surface of flap 2 for allowing a discharge of the pressurized air as a boundary layer control airflow over the upper surface of flap 2 from the spanwise duct members 5a, 5b, 5c and 5d. Each of these spanwise duct members has a spanwise extending arcuate gap formed between an upper spanwise extending surface 29a and a lower spanwise extending surface 29b in each of the duct members 5a, 5b, 5c and 5d. The leading edge 2b of flap 2 is connected to arcuate bridging members 30, which in turn are connected to the lower surfaces 29b of duct members 5a, 5b, 5c and 5d, while the upper surface 2c of flap 2 extends forward and under the connecting points of bridging members 30 and the flap forward surface 2b to be connected to the duct members 5 adjacent the upper surface 29a. The boundary layer control efflux discharge slots or nozzles 12 are formed by spacers 31 inserted between the overlap between upper surface 2c of flap 2 and bridging member 30 so as to spatially remove upper surface 2c from bridging member 30 thereby creating slot passages 12 between adjacent spacers 31 for discharge of the pressurized air supplied to members of duct system 5 therefrom, as indicated by arrows 32 in both FIGURES 5 and 8. It is to be understood that spacers 31 serve as rigidifying supports between upper flap surface 2c and bridging member 30, and that such rigidity can be dispensed with if not needed, thereby providing continuous nozzles or slots 12.

Figure 6:
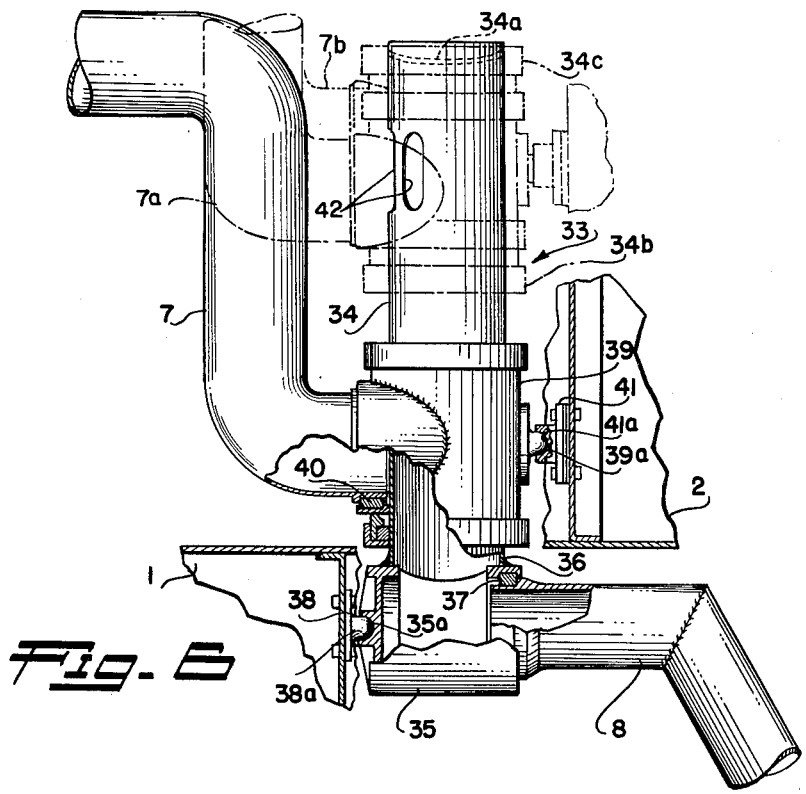
FIGURE 6 is an enlargement showing the details of the sliding valve arrangement and duct delivery means of pressurized air to the flap when extended for discharge therefrom as a boundary layer control airflow.

In order to provide flexible communication between bypass duct member 7 in flap 2 and duct assembly 8 in the wing 1, I provide a sliding valve device 33, details of which are shown in FIGURE 6. This structure comprises a transfer tube or duct 34 having a swivel cap 35 secured thereto at one end as by weld 36, the swivel cap 35 having an opening at one side thereof in which the end of wing duct assembly 8 is swivelly or pivotally mounted therein, there being a seal ring 37 interposed between the adjacent surfaces of the opening in swivel cap 35 and wing duct assembly 8. The seal 37 is preferably of Teflon, although it may be of any other appropriate material having low frictional properties so as to provide an easy rotational relative movement between swivel cap 35 and wing duct assembly 8. The other end of swivel cap 35 has a calathiform depression 35a at the center thereof which seats on a pivot fitting 38 fixedly secured to the internal structure of wing 1.

One end of bypass duct member 7 is rotatively mounted within an opening in a sleeve 39 that is slidably mounted on transfer duct 34, the connection between bypass duct member 7 and sleeve 39 similar to the connection between wing duct assembly 8 and swivel cap 35, and also having a seal 40 interposed between adjacent surfaces. Diametrically opposite of the connection of bypass duct member 7 with sleeve 39 is a pivotal nub 39a which fits into a calathiform depression 41a in pivot fitting 41 fixedly secured to the internal structure of flap 2.

The end of transfer duct 34 opposite from the end into which swivel cap 35 is mounted is sealed by a cap member 34a. Adjacent the end of transfer duct 34 that is sealed by cap 34a are a plurality of axially elongated radial openings or passages through the wall of transfer duct 34 which allow free communication between wing duct assembly 8 and bypass duct member 7 when the flap 2 is extended from wing 1 to the extent sufficient for sleeve 39 to cover or surround the passages 42. Because of flap 2 being of the displacement type relative to wing 1, extension of the flap will result in sleeve 39 sliding along or over transfer duct 34 a sufficient distance until sleeve 39 is coextensive with passages 42 thereby allowing free communication between the interiors of bypass duct member 7 and transfer duct 34. The rotational components of the flap extension or actuation are compensated for by the pivotal axes through pivotal fittings 38 and 41, the rotation around the axis of pivotal fitting 38 compensating for the vertical component of the travel of the pivotal axis of flap 2, while the rotation around the axis of pivotal fitting 41 compensating for the relative angular movement of flap 2 to the chord of wing 1 about the pivotal axis of the flap 2.

The axial location of passages 42 along transfer duct 34 are determined by the range of flap extension during which a boundary layer control airflow is desired to be discharged from the elongated spanwise slots 12 on the upper forward surface of flap 2. In the embodiment of the invention depicted in the drawings, the location of openings 42 are such that at 30° extension of flap 2, micro-relay switch 23 is closed causing the compressor discharge bleed pad valve 9 to open allowing pressurized air to flow through wing duct assembly 8, swivel cap 35, transfer duct 34 into bypass duct member 7, sleeve 34 covering openings 42 at 30° of flap extension. This pressurized air supply is maintained through 50° flap extension whereupon the flap travel is stopped by the down-flap stop means 21 or the circuit controlling compressor discharge bleed pad valve 9 is opened, causing valve 9 to close and cease the supply of pressurized air to the flap duct members.

Being a displacement type flap having an airflow from the lower surface of the wing 1 to the upper surface of flap 2 as indicated by arrows 26 in FIGURE 5, FIGURE 7 depicts the various relationships between the members of the four-bar linkage structures 4 for having a flap extension of constant angularity while varying the chordal displacement of the flap for creation of a tapered slot. In this modification the mechanical screw-jacks 13, drives 14, pivotal centers 17a and 17b of the bellcranks 17, 17d, 17e and 17f are all identical. For a flap extension achieving a tapered slot, the pivotal center 17b of bellcrank 17 is relocated to phantomed positions indicated for the other bellcranks 17d, 17e and 17f, which in turn causes a less chordal displacement of flap fitting 19 as the distance between pivotal axes 17b and 17c decreases. There is a similar relationship for decreasing distances along wing fittings 18 between pivotal axes 17b and 20a, 20d, 20e and 20f, plus a corresponding decrease in the length of flap links 20, to cause a tapered or variable width slot throughout the slot span with a constant angular rate of motion of the flap.

In operation, when flap 2 is to be extended, motor 15 is energized causing shafts 16 of mechanical screw-jacks 13 to extend rotating bellcranks 17 about fixed pivotal axis 17b. The four-bar linkage structures 4 cause the flap 2 to be chordally displaced relative to wing 1 with a concurrent angular rotation of flap 2. During the movement of flap 2, sleeve 39 slides along transfer duct 34 by its connection to bypass duct member 7 and flap pivot fitting 41, the transfer tube 34 rotating slightly about the axis of wing pivot fitting 38 for the compensation of the vertical change or relocation of the pivotal axis of flap 2 relative to the axis of pivot fitting 38, while the flap 2 and bypass duct 7 therewith, rotate about the axis of flap pivot fitting 41 relative to sleeve 39 to compensate for the relative angular change between the chord of flap 2 and the axis or centerline of sleeve 39.

When the flap extension has reached 30°, sleeve 39 will be in phantomed position 34b on transfer duct 34 and bellcrank 17 will have closed micro-relay switch 23 causing compressor discharge bleed pad valve 9 to open. Thereupon, pressurized air is supplied to the duct members within flap 2 from the pressurized air source, in this case powerplant 10, through wing duct assembly 8, swivel cap 35, transfer duct 34, sleeve 39 and bypass duct members 7. This pressurized air discharges from the duct system 5 in flap 2 through the elongated spanwise slots or nozzles 12 to flow over the upper surface of flap 2 as indicated by arrows 32 in FIGURE 5. Concurrently, the extension of the flap creates a slot between the leading edge of the flap 2 and the trailing edge of wing 1 for an airflow, likewise as indicated by arrows 26 in FIGURE 5, and therefore giving a most efficient boundary layer control airflow over the upper surface of flap 2, the angle of impingement of boundary layer control airflow depicted by arrows 32 being at a constant angle to the upper surface of flap 2 regardless of the position of the flap when pressurized air is delivered to the duct structures within flap 2.

In the embodiment shown, the desirous range of boundary layer control airflow 32 is when flap extension is between 30° to 50° and upon the occurrence of flap extension attaining 50° one of the bellcranks 17 contacts the down-flap stop means 21 and/or micro-relay switch 22. The down-flap stop means 21 prevents further movement of flap 2 relative to wing 1 while the tripping of micro-relay switch 22 opens the circuit supplying power to motor means 15 thereby stopping further extension of mechanical screw-jacks 13. If further flap extension is allowed beyond the range a boundary layer control airflow is desired, micro-relay switch 22 will be tripped first shutting off the delivery of pressurized air to duct system 5 in flap 2, and flap 2 will continue extension until down-flap stop means 21 becomes effective.

For flap retraction, motor 15 is reversed and the above operation follows in opposite sequence with the compressor discharge bleed pad valve 9 closing when the flap 2 passes the 30° extension point. Over-travel of the flap retraction is prevented by the up-flap stop means 24 engaging one of the bellcranks 17, and thus, preventing further flap travel.

Thus it can be seen I have provided a displacement type flap structure and operating mechanism whereby a boundary layer control airflow discharge from the flap is supplied over the upper surface of the flap when extended, with the direction of impingement of the boundary layer control airflow on the flap surface constant regardless of the position of the flap, the control of the boundary layer airflow being accomplished by control of the source thereof, in this case the valve 9 and sliding sleeve 39 combined with transfer duct 34.

While a particular embodiment of the invention has been illustrated and described, it will be obvious to those skilled in the art that various changes and modifications may be made without departure from the invention and it is intended to cover in the appended claims all such modifications and equivalents as fall within the true spirit and scope of this invention.

What is claimed is:

1. In combination with an airfoil structure, a flap, actuable connecting means securing said flap spanwise along the trailing edge of said airfoil, actuation means for driving the connecting means for flap travel relative to the airfoil, said flap travel comprising a path having both a chordal linear displacement and a rotative displacement relative to said airfoil, a duct assembly located within the flap structure, a pressurized air source, duct means interconnecting the flap duct assembly and pressurized air source, and discharge means from the flap duct assembly for discharging a boundary layer control airflow over the upper surface of the flap at a constant angle of impingement upon flap extension regardless of flap position relative to the airfoil.

2. In combination with an airfoil structure, a flap, actuable connecting means securing said flap spanwise along the trailing edge of said airfoil, actuation means for driving the connecting means for flap travel relative to the airfoil, said flap travel comprising a path having both a chordal linear displacement and a rotative displacement relative to said airfoil, a duct assembly located within the flap structure, a pressurized air source, duct means interconnecting the flap duct assembly and pressurized air source, and discharge means from the flap duct assembly of elongated efflux slots extending spanwise along the forward upper surface of the flap for discharging a boundary layer control airflow thereof at a constant angle of impingement upon flap extension regardless of flap position relative to the airfoil.

3. In combination with an airfoil structure, a flap, actuable connecting means securing said flap spanwise along the trailing edge of said airfoil, actuation means for driving the connecting means for chordal displacement and angular flap travel relative to the airfoil, a first duct assembly located within the flap structure, a pressurized air source, a second duct assembly located within the wing structure and connected to said air pressure source, a third duct assembly interconnecting the first duct assembly to the second duct assembly for supplying pressurized air from said source to the first flap duct assembly, said third duct assembly allowing relative movement between the first and second duct assemblies during flap travel, and discharge means from the flap duct assembly for discharging a boundary layer control airflow over the upper surface of the flap at a constant angle of impingement upon flap travel regardless of flap position relative to the airfoil.

4. In combination with an airfoil structure, a flap, actuable connecting means securing said flap spanwise along the trailing edge of said airfoil, actuation means for driving the connecting means for flap travel relative to the airfoil, said flap travel comprising a path having both a chordal linear displacement and a rotative displacement relative to said airfoil, a first duct assembly located within the flap structure, a pressurized air source, a second duct assembly located within the wing structure and connected to said pressure source, a third duct assembly interconnecting the first duct assembly to the second duct assembly for supplying pressurized air from said source to the first flap duct assembly, valve means in said third duct assembly for allowing passage of pressurized air therethrough within a certain range of flap travel relative to the airfoil, and dicharge means from the first duct assembly in the flap for discharging a boundary layer control airflow over the upper surface of the flap at a constant angle of impingement regardless of flap position relative to the airfoil when said valve means is open allowing passage of pressurized air to the first duct assembly in the flap.

5. In combination with an airfoil structure, a flap, actuable connecting means securing said flap spanwise along the trailing edge of said airfoil, actuating means for driving the connecting means for chordal displacement and angular flap travel relative to the airfoil, a first duct assembly located within the flap structure, a pressurized air source, a second duct assembly located within the wing structure and connected to said pressurized air source, a third duct assembly rotatively connected at one end to the second wing duct assembly for relative rotation therewith and having at least one radial passage through the wall thereof at the other end, a sleeve member rotatively connected to one end of the first flap duct assembly for relative rotation therewith and having a radial opening through the wall thereof in alignment with the passage at said end of the first flap duct assembly, said sleeve member mounted coaxially around the third duct assembly for sliding engagement thereover, and discharge means from the flap duct assembly for discharging a boundary layer control airflow over the upper surface of the flap at a constant angle of impingement regardless of flap position relative to the airfoil, the boundary layer control flow discharge occurring during a predetermined range of flap extension when the sleeve member opening is located over the passage in the third duct assembly by the chordal displacement of the flap and sleeve thereby allowing free communication between the pressurized air source and discharge means in the flap.

6. In combination with an airfoil structure, a flap, actuable connecting means securing said flap spanwise along the trailing edge of said airfoil, actuation means for driving the connecting means for chordal displacement and angular flap travel relative to the airfoil, a first duct assembly located within the flap structure, a pressurized air source, a second duct assembly located within the wing structure and connected to said pressurized air source, a third duct assembly rotatively connected at one end to the second wing duct assembly for relative rotation therewith and having at least one radial passage through the wall thereof at the other end, a sleeve member rotatively connected to one end of the first flap duct assembly for relative rotation therewith and having a radial opening through the wall thereof in alignment with the passage at said end of the first flap duct assembly, said sleeve member mounted coaxially around the third duct assembly for sliding engagement thereover, and discharge means from the flap duct assembly of elongated efflux slots extending spanwise along the forward upper surface of the flap for discharging a boundary layer control airflow thereof at a constant angle of impingement regardless of flap position relative to the airfoil, the boundary layer control airflow discharge occurring during a predetermined range of flap extension when the sleeve member opening is located over the passage in the third duct assembly by the chordal displacement of the flap and sleeve thereby allowing free communication between the pressurized air source and discharge means in the flap.

7. In combination with an airfoil structure of changing chord length in a spanwise direction, a flap, a plurality of actuable connecting means for varying dimensions securing said flap spanwise along the trailing edge of said airfoil, actuation means for driving the connecting means for flap travel relative to the airfoil, said flap travel comprising a path having both a chordal linear displacement and a rotative displacement relative to said airfoil thereby forming a slot between the flap and airfoil when the flap is extended, said flap rotational displacement being at equal rates of angular rotation at all spanwise points of the flap and said flap chordal linear displacement at all points along the flap span being in equal ratio relative to the airfoil chord at that corresponding point whereby a variable width slot results between the airfoil trailing edge and flap leading edge, a duct assembly located within the flap structure, a pressurized air source, duct means interconnecting the flap duct assembly and pressurized air source, and discharge means from the flap duct assembly for discharging a boundary layer control airflow from the pressurized air source over the upper surface of the flap at a constant angle of impingement upon flap travel regardless of flap position relative to the airfoil.

8. In combination with an airfoil structure, a flap, a pressurized air source, actuable connecting means securing said flap spanwise along the trailing edge of said airfoil, actuating means for driving the connecting means for flap travel relative to the airfoil and pressurized air source, said flap travel comprising a path having both a chordal linear displacement and a rotative displacement relative to said airfoil, a duct assembly within the flap structure, duct means interconnecting the flap duct assembly and pressurized air source, a valve between the interconnecting duct means and the pressurized air source, and discharge means from the flap duct assembly for discharging a boundary layer control airflow over the upper surface of the flap at a constant angle of impingement upon flap extension regardless of flap position relative to the airfoil when said valve is open.

9. In combination with an airfoil structure, a flap, actuable connecting means securing said flap along the trailing edge of said airfoil, actuation means for driving the connecting means for flap travel relative to the airfoil, said flap travel comprising a path having both a chordal linear displacement and a rotative displacement relative to said airfoil, a duct assembly located within the flap structure, a pressurized air source, duct means interconnecting the flap duct assembly and pressurized air source, a valve between the interconnecting duct means and the pressurized air source, discharge means from the flap duct assembly for discharging a boundary layer control airflow over the upper surface of the flap at a constant angle of impingement regardless of flap position relative to the airfoil when said valve is open, and valve control means cooperable with one of said actuable connecting means for opening and closing said valve as the flap enters and leaves a predetermined range of flap travel for controlling flap boundary layer control airflow discharge from the flap duct assembly when the flap is extended within said predetermined range.

10. In combination with an airfoil structure, a flap, actuable connecting means securing said flap along the trailing edge of said airfoil, actuation means for driving the connecting means for chordal displacement and angular flap travel relative to the airfoil, a first duct assembly located within the flap structure, a pressurized air source, a second duct assembly located within the wing structure and connected to said pressurized air source, a valve between the second wing duct assembly and the pressurized air source, a third duct assembly rotatively connected at one end to the second wing duct assembly for relative rotation therewith and having at least one radial passage through the wall thereof at the other end, a sleeve member rotatively connected to one end of the first flap duct assembly for relative rotation therewith and having a radial opening through the wall thereof in alignment with the passage at said end of the first flap duct assembly, said sleeve member mounted coaxially around the third duct assembly for sliding engagement thereover, discharge means from the flap duct assembly for discharging a boundary layer control airflow over the upper surface of the flap at a constant angle of impingement regardless of flap position relative to the airfoil, and valve control means cooperable with one of said actuable connecting means for opening and closing said valve as the flap enters and leaves a predetermined range of flap extension, said boundary layer control airflow discharge occurring during said predetermined range of flap extension when the sleeve member opening is located over the passage in the third duct assembly by the chordal displacement of the flap and the pressurized air source valve is open thereby allowing free communication between the pressurized air source and discharge means in the flap for controlling flap boundary layer control airflow discharge from the flap duct assembly when the flap is extended within said predetermined range.

References Cited in the file of this patent

UNITED STATES PATENTS

| | | |
|---|---|---|
| 711,609 | Woodnall | Oct. 21, 1902 |
| 2,469,902 | Stalker | May 10, 1949 |
| 2,478,793 | Trey | Aug. 9, 1949 |
| 2,509,671 | Christensen | May 30, 1950 |
| 2,511,504 | Hawkins | June 13, 1950 |
| 2,886,264 | Seager | May 12, 1959 |